United States Patent
Chen et al.

(10) Patent No.: US 11,088,962 B2
(45) Date of Patent: Aug. 10, 2021

(54) METHOD FOR PERFORMANT DATA TRANSMISSION IN A DATA NETWORK WITH, IN PART, REAL-TIME REQUIREMENTS AND APPARATUS FOR CARRYING OUT THE METHOD

(71) Applicant: SIEMENS AKTIENGESELLSCHAFT, Munich (DE)

(72) Inventors: Feng Chen, Feucht (DE); Franz-Josef Götz, Heideck (DE); An Ninh Nguyen, Nuremberg (DE); Jürgen Schmitt, Fürth (DE); Marcel Kiessling, Velden (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/628,964

(22) PCT Filed: Jul. 6, 2017

(86) PCT No.: PCT/EP2017/066989
§ 371 (c)(1),
(2) Date: Jan. 6, 2020

(87) PCT Pub. No.: WO2019/007516
PCT Pub. Date: Jan. 10, 2019

(65) Prior Publication Data
US 2020/0228457 A1    Jul. 16, 2020

(51) Int. Cl.
*H04L 12/911* (2013.01)
*H04L 12/875* (2013.01)
(Continued)

(52) U.S. Cl.
CPC .............. *H04L 47/72* (2013.01); *H04L 47/56* (2013.01); *H04L 47/801* (2013.01); *H04L 47/805* (2013.01); *H04L 67/12* (2013.01)

(58) Field of Classification Search
CPC . H04L 49/90; H04L 49/3036; H04L 49/3045; H04L 49/506; H04L 49/9057; H04L 49/9063
See application file for complete search history.

(56) References Cited

U.S. PATENT DOCUMENTS 7,058,071 B1 * 6/2006 Myles ..................... H04L 49/90
370/419
7,953,002 B2 * 5/2011 Opsasnick .......... H04L 47/2441
370/230

(Continued)

OTHER PUBLICATIONS

Cena, Gianluca, et al. "Performance analysis of Ethernet Powerlink networks for distributed control and automation systems." Computer Standards & Interfaces 31.3 (2009): 566-572.

(Continued)

*Primary Examiner* — Chandrahas B Patel
(74) *Attorney, Agent, or Firm* — Lempia Summerfield Katz LLC

(57) ABSTRACT

The invention relates to a method and to a device that describe a real-time network plan for industrial control and monitoring applications, wherein standard Ethernet switching elements are used for the communication network, in particular on the basis of the new mechanisms according to the IEEE 802.1 TSN Task Group. The sequence plan combines clocked data transfer with the stream reservation concept and thus provides determinism with guaranteed maximum latency and access controls at runtime.

18 Claims, 6 Drawing Sheets

(51) Int. Cl.
    *H04L 12/927*    (2013.01)
    *H04L 29/08*     (2006.01)

(56) References Cited

U.S. PATENT DOCUMENTS

| | | | |
|---|---|---|---|
| 10,630,720 B2 * | 4/2020 | Voelker | H04L 63/08 |
| 10,681,128 B2 * | 6/2020 | Wetterwald | H04L 67/1095 |
| 10,687,128 B2 * | 6/2020 | Szymanski | H04L 47/56 |

OTHER PUBLICATIONS

Dürr, Frank, and Naresh Ganesh Nayak. "No-wait packet scheduling for IEEE time-sensitive networks (TSN)." Proceedings of the 24th International Conference on Real-Time Networks and Systems. ACM, 2016.

PCT International Search Report and Written Opinion of International Searching Authority dated Mar. 2, 2018 corresponding to PCT International Application No. PCT/EP2017/066989.

Schlesinger, Ralf, Andreas Springer, and Thilo Sauter. "Automatic packing mechanism for simplification of the scheduling in Profinet IRT." IEEE Transactions on Industrial Informatics 12.5 (2015): 1822-1831.

Teener, MD Johas. "IEEE 802 Time-Sensitive Networking: Extending beyond AVB." Sep. 30, 2013: 1-30.

\* cited by examiner

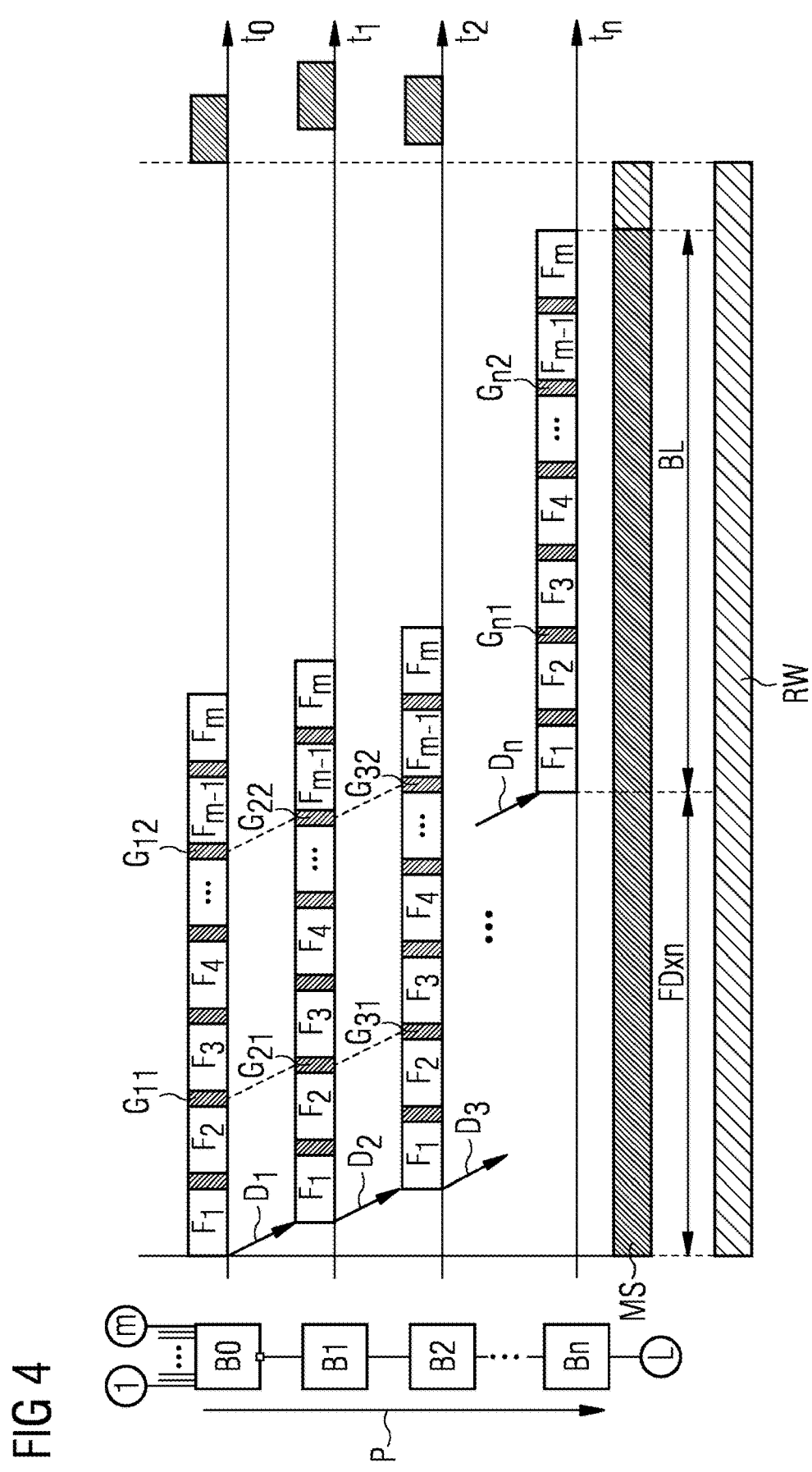

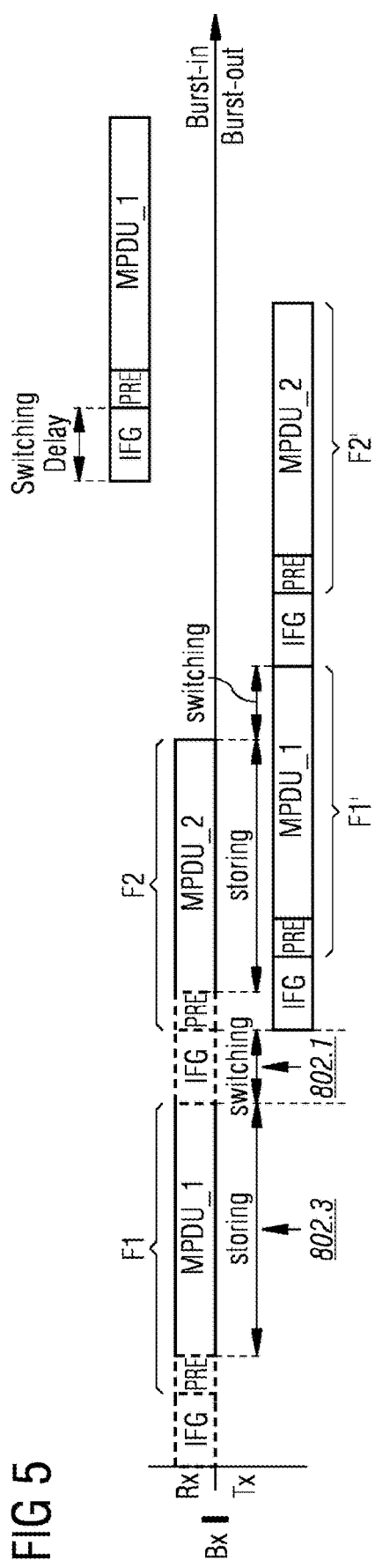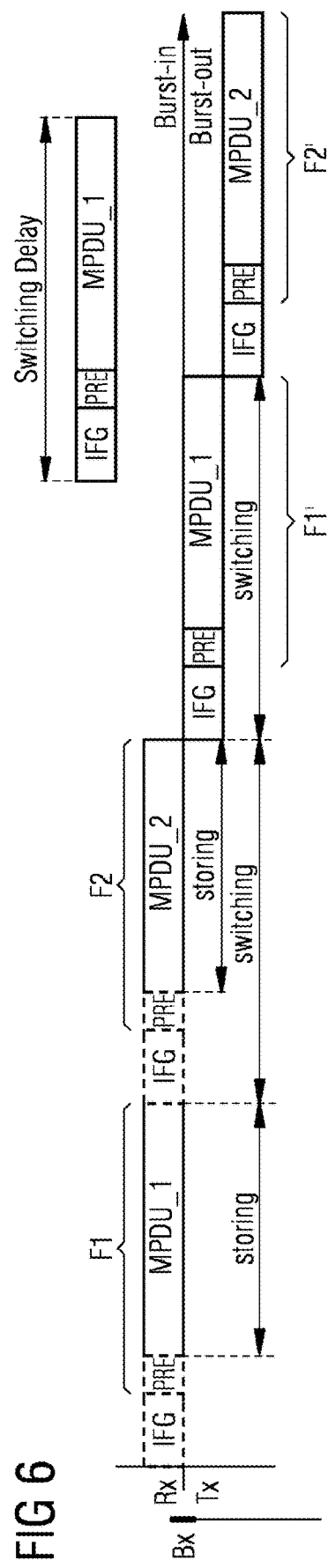

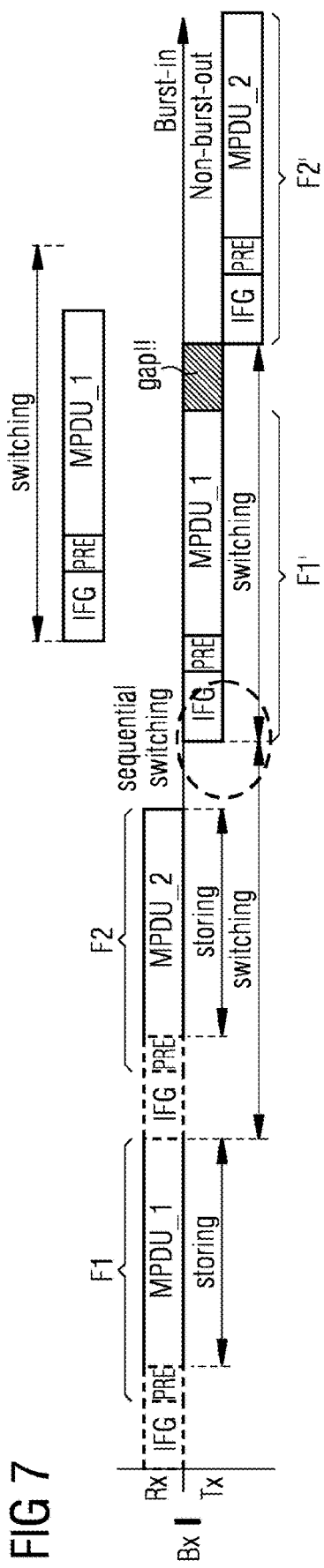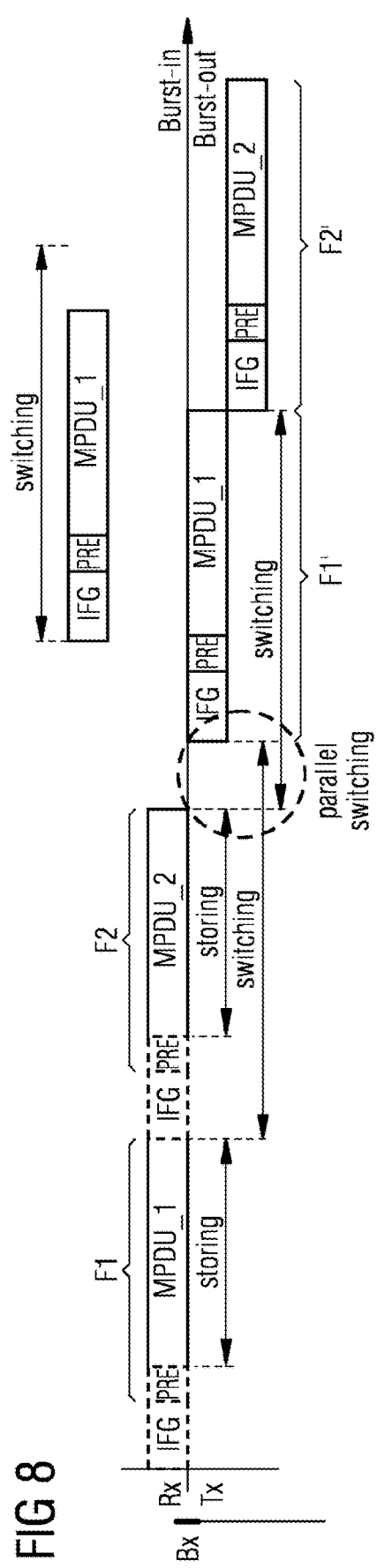

METHOD FOR PERFORMANT DATA TRANSMISSION IN A DATA NETWORK WITH, IN PART, REAL-TIME REQUIREMENTS AND APPARATUS FOR CARRYING OUT THE METHOD

This application is the National Stage of International Application No. PCT/EP2017/066989, filed Jul. 6, 2017. The entire contents of this document is hereby incorporated herein by reference.

BACKGROUND

Industrial applications, such as distributed IO systems in industrial automation, are dependent on the availability and reliability of deterministic data transport. This provides that the data to be transmitted is delivered to the receiver as far as possible in real time, in a reliable manner and with little latency. In this case, the data transmission in these networks is distinguished, inter alia, by virtue of the fact that smaller predictable volumes of data are transmitted at, for example, regular intervals in a preplannable manner (e.g., measured values from sensors or control commands to actuators in the industrial installation). The volumes of data may be combined in a burst (e.g., a stream or a set of a plurality of data frames).

In the past, hardware developed specifically for this purpose and for use in the industrial environment was used to set up industrial networks (e.g., in a bus topology; all users are connected by a common message path). Such a bus system is illustrated, by way of example, in FIG. 1, where various users 11, 12, 13 that may communicate with one another are connected via the transmission path NB containing the network elements B0 . . . B3.

However, the bus system is not exclusively used; an alternative topology is, for example, the ring NR, as illustrated in FIG. 2; in this case, the network elements B0 . . . B3 are connected to one another in a ring structure, which allows two transmission directions when transmitting data packets between the connected users 11, 12, 13. At present, the standardized Ethernet technology is used to transport data in virtually all modern networks.

The manufacturers of industrial automation installations are therefore developing solutions based on Ethernet, with dedicated hardware expansions in order to meet the requirements of the applications, and provide the desired real-time behavior of the network.

One of these systems designed in this manner is PROFINET, short for Process Field Network. Profinet uses TCP/IP and IT standards, has real-time Ethernet capability, and makes it possible to integrate field bus systems. PROFINET itself defines two real-time protocols: RT (Real Time) and IRT (Isochronous Real Time) in order to transmit time-critical data for the Profinet IO applications with different real-time requirements.

Profinet RT runs on standard Ethernet hardware and handles the Profinet IO applications with cycle times of up to 10 ms. On the data plane, Profinet RT uses priorities of the standard Ethernet switching technology in order to transmit real-time data with a higher priority than the normal data that is not be transmitted in real time. The advantage of Profinet RT is that operation does not require any time synchronization of the network elements and therefore manages with little engineering effort.

However, the sole use of Profinet RT provides only a slight real-time behavior because the transmission of a high-priority data packet has a transmission delay of up to a data frame of maximum size for each hop from one network element to the next.

For IO applications with fast control loops, such as in motion control in a drive system, Profinet IRT provides a high degree of determinism and may offer cycle times of less than 1 ms to 31.25 µs.

Profin6et IRT uses time synchronization with jitter (e.g., temporal clock jitter when transmitting digital signals) of less than 1 µs, transmission with scheduling (e.g., time-scheduled, similar to time division multiple access (TDMA)) and "cut-through" switching (e.g., the switching station already forwards the data frame to be transmitted before the data frame has been completely received from the preceding switching station).

As already explained, these two transmission methods require specific hardware that is suitable for use in an industrial Ethernet.

The principle of IRT provides for the IRT data transfer (e.g., the transmission of IRT data) to be protected from interference from another data transfer (e.g., RT and further, non-RT data). This is effected by using dedicated time windows (e.g., reserved bandwidths for the "red phase", "green phase" and "yellow phase" of Profinet IRT) and by minimizing the time delay of the IRT data frames at the bridges (e.g., switching centers) by using the cut-through switching described above.

In this case, the "red phase" is strictly reserved for Class 3 PROFINET RT, which has the highest priority (e.g., no other data packets may be transmitted in this time).

In order to implement these requirements, an off-line engineering tool to calculate the transmission time of each IRT data frame at the source (e.g., also "injection time") and the IRT schedule at each bridge is to be provided. In order to provide that all IRT frames at each stage are forwarded by cut-through switching without hindering one another, the IRT scheduling tool is to plan with the maximum synchronization error, and calculates a sufficiently large time gap as a safety buffer for the respective injection time between two arbitrary data frames that were generated/transmitted by two different data sources and are intended to be successively forwarded from the same output port (e.g., egress port) of a switching center (e.g., bridge) along a transmission path. The forwarding process itself is highly dependent on the underlying hardware implementation. The schedule takes into account all HW influences and may therefore be used only in the known technology with HW devices that were taken into account in the planning Such conflicts would result in a loss of data because buffering/queueing is usually not offered by the cut-through switching and the data frame is discarded.

Reference is also made to system design below. A previously known set of data frames is to be able to be transmitted in a network in a guaranteed manner (e.g., without a loss of data and within a guaranteed transmission time) irrespective of the underlying topology. For this purpose, the maximum number of RT data frames that may be transmitted in a guaranteed manner in the network without a loss of data is determined for a known maximum number of hops in the network and a maximum packet length of the RT frames (e.g., streams in TSN) and a known latency (e.g., delay time) at the switching centers.

Protocols for Ethernet are being constantly further developed. The audio video bridging (AVB) Working Group of the IEEE has defined a set of features for the reliable transmission of audio and video data within a maximum latency.

A new type of data traffic, the "reserved traffic", is introduced. Audio and video data that occurs periodically is transmitted in "streams". The information relating to the network configuration is concealed from the user by the stream reservation protocol (SRP, IEEE 802.1Qat). The SRP provides a mechanism for access control implemented in combination with the reservation of resources; an end-to-end latency may therefore be guaranteed for this periodically occurring data traffic (e.g., stream).

TSN has also introduced, as a new forwarding behavior, the TAS (Time-Aware-Shaper, IEEE 802.1 QBR) mechanism in order to achieve the shortest possible latency.

The forwarding is tackled by a schedule, similar to the IRT, and makes it possible to develop real-time systems with the shortest latency for each data frame.

In summary, virtually all manufacturers of industrial real-time systems currently use hardware specifically developed for this purpose in order to obtain high-performance systems. However, these have little flexibility with respect to a change in the application scenario. Alternatively, use is made of standardized hardware that has a poorer performance with more flexible possible applications.

As already described above, PROFINET defines RT (Real Time) and IRT (Isochronous Real Time) for the Profinet IO applications with different real-time requirements.

Profinet RT is executed on standardized hardware and is not dependent on time synchronization mechanisms. Profinet RT requires little engineering effort in advance. Since the concept is based on the prioritization of data packets, Profinet RT offers only limited real-time possibilities.

Profinet IRT requires special hardware in order to offer a high degree of determinism based on advance off-line engineering and planning. The scheduling concept is less flexible and is to offer safety buffers for stability reasons.

AVB introduces a highly flexible system that provides a simple protocol for the end stations in order to comply with the requirements of the industrial applications in terms of flexibility. The performance of an AVB network is sufficient to meet the requirements of audio and video applications, but the AVB systems are not strong enough to meet the requirements imposed on the latencies of the industrial applications.

TSN is a highly deterministic system that provides a mechanism for configuring time-based transmission within the switching centers/bridges. This offers the provider, a TDMA-based system, the calculation method and the scheduling concept for the required configuration of these systems outside the IEEE standardization activities.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved method and an apparatus for performant data transmission in an industrial data network with, at least in part, real-time requirements are provided. The method may be implemented using standard Ethernet switching elements for the communication network.

The method according to one or more of the present embodiments for the preferred, performant transmission of a set of data packets in an industrial network including switching nodes from a data transmitter to a data receiver respectively from a first switching node to a second switching mode is provided. A time window of the transmission bandwidth is respectively exclusively reserved for transmitting the set of data packets, and the start of the transmission time window is time-synchronized in all transmitting switching nodes in the network.

The apparatus (e.g., the switching node) is suitable for the preferred, performant transmission of a set of data packets on the way from a data transmitter to a data receiver. The set of data packets is received by the switching node via an input port and is transmitted to a second switching node via an output port. A time window of the transmission bandwidth is respectively exclusively reserved, and the start of the transmission time window is time-synchronized in all transmitting switching nodes in the network.

The method and the apparatus of the present embodiments describe a real-time network plan for industrial control and monitoring applications, where standard Ethernet switching elements are used for the communication network (e.g., based on the new mechanisms according to the IEEE 802.1 TSN Task Group). The schedule combines time-clocked data transmission with the stream reservation concept and therefore provides determinism with a guaranteed maximum latency and access controls at runtime.

The above-mentioned system design may be determined, as described below, in the following four acts: A worst-case topology is assumed (e.g., a bus system with a maximum distance between transmitters and receivers); the TAS window length for the cycle is determined (e.g., 50% of the time for the planned real-time transmission and 50% for other data traffic); the remaining burst length results from the difference of the window length minus the latency component; and the burst length calculated in this manner then results in the number of possible RT frames that may be transmitted in the time.

As long as the assumed boundary conditions are satisfied, users with RT data frames may be added and removed at any location in the network without jeopardizing the guaranteed transmission. The boundary conditions (e.g., maximum packet length and maximum number of RT data frames) are checked by a reservation protocol, and a further registration is possibly rejected.

The approach introduces a new resource reservation mechanism and simplifies the switching of data packets via the industrial Ethernet by using a "daisy-chain" topology (e.g., the switching nodes are lined up, like in a "chain", in a bus or ring topology; see FIG. 1 or FIG. 2), which is widespread in industrial control systems.

In other topologies, the maximum number of stations is to be restricted; star topologies and meshed networks (e.g., completely networked topologies) may be theoretically used as long as a maximum "hop count" (e.g., the number of stations from transmitter to receiver) may be defined based on the currently used topology. Such a transport network consisting of switching centers/bridges and end stations may be modeled, where the bridges are connected to one another, as described, via trunk ports to form a transport network The switching centers/bridges are connected to the end stations (e.g., the sources and sinks of the generated data) via "edge ports". An exemplary structure is shown in FIG. 1.

The described scheme is independent of topology and requires less configuration information in comparison with pure TDMA systems or similar systems. The configuration is based on a special model for the conventional reservation mechanism/stream reservation for RT real-time data transfer in a preconfigured RT phase.

Data Plane

As a first measure for achieving a guaranteed latency in the network, planned data traffic is similarly transmitted in a manner standardized in IEEE 802.1 Qbv-2016. Like in Profinet IRT with red and green phases, the cycle time is divided into two phases. The process begins with a protected time window that is exclusively reserved for the transmission of real-time data (e.g., RT phase). This is respectively followed by an unprotected window for other data transfer.

Unlike Profinet IRT, which requires an explicit configuration of the yellow phase, the data transfer that is scheduled according to the IEEE standard provides an implied "guard band" function in the gate operations. In order to adjust the planned time phases of all switching centers/bridges to common start and end times that are the basis for the scheduled data transfer based on IEEE 802.1AS-2011, for example, or another time-synchronized protocol such as IEEE 1588, it is a prerequisite that all network elements (e.g., bridges and end stations) are time-synchronized.

The end stations are to inject the cyclical real-time data streams into the network at the start of each cycle via the "edge" input ports and are to transmit all data frames to be transmitted as burst traffic. The received real-time data packets are buffered in each bridge with real-time capability and are buffered in the correct output queue, which belongs to the protected transmission window, and are then transmitted in the store & forward mode.

Configuration

In contrast to PROFINET IRT, which is to be planned/engineered completely off-line and in advance, this design adopts a configuration model that combines both approaches, the off-line configuration and access control at runtime. An advantage of the procedure is the lower engineering effort and the offered support for dynamic configurations of real-time data streams in comparison with other time-based real-time solutions such as PROFINET IRT.

The main configuration tasks that are to be carried out off-line in advance are primarily in the field of transport classes (e.g., Quality of Service (QoS)), including transport class parameters and the set-up of the planned data transfer.

A network-wide consistent priority value is to be defined as a QoS identifier and is to be used by all real-time streams. The application of this priority value to a transport class (e.g., outgoing queue for real-time transmission) on each individual bridge belongs to the local bridge configuration. In order to draw up the cyclical schedules for the time-clocked data transmission, a checklist is to be configured for each port gate on each bridge using the managed objects specified in IEEE 802.1 Qbr. All bridges in the network are to operate with the same schedule.

In order to achieve automatic network configuration on the stream plane at runtime, the principle of the Stream Reservation Protocol (SRP), IEEE 802.1 Q 2014, may be used in one embodiment. The principle of the SRP was developed as a plug-and-play stream configuration mechanism for AVB systems.

The basic principle involves applying the protocol to the network in order to carry out access control, latency control, bandwidth and resource reservation, inclusive for every data stream that is to be transmitted in the network.

Worst-Case Latency

An important aspect of the stream reservation mechanism is the possibility of calculating the worst-case latency that is dependent on the maximum frame size and the maximum number of hops in this design. The calculation is based on the synchronized injection of RT data frames by the end stations at the start of the RT phase and a known maximum network diameter that defines the worst-case latency of an individual frame in the network. This enables simplified resource planning inside the network.

RT frames are transmitted in the network in a scheduled transmission window that is reserved for real-time data transmission, which is intended to prevent other data traffic from influencing the transmission. The previously known injection times provide the possibility of simplification (e.g., all bridges are configured with the same starting point and the same size of the temporal transmission window).

A further simplification is based on the previously known maximum protocol data unit (PDU) (e.g., data frame) size of the real-time transmission. The introduction of a maximum size of the RT class simplifies the calculation of the worst-case latency and enables a new simplified model for the stream reservation protocol (SRP).

A guaranteed maximum latency may be achieved if all real-time streams in the current cycle complete data transmission before expiry of the estimated transmission window of the current transmission cycle, which results in a linked maximum latency (e.g., processing time, a "make span" for communication between industrial control devices).

This principle behind the calculation of the worst-case latency is similar to the concept used in stream reservation for AVB systems with credit based shaper (CBSA) for forwarding, in each subnetwork section, where the latency in a subnetwork section is not calculated in an end-to-end manner in this approach. Therefore, the described system enables shorter latencies than the AVB network. An AVB network may be interpreted as an individual AVB bridge, and the reservation scheme of stream reservation may be used.

The described system combines a simplified scheduling concept with dynamic stream reservation and access control. The advantage is the reduced effort for engineering and provides support for dynamic configuration of real-time streams. The new scheme is independent of topology and requires only very little precalculation of the time schedule, which results in simplified configuration information. The configuration of the schedule depends on the maximum hop count and transmission cycles in the network and is the same for each individual bridge.

All bridges receive the same configuration for the planned data traffic during the design and configuration phase.

All end stations transmit data in a burst at the start of the transmission phase, and there is no need for any frame-granular coordination between different end stations.

For each schedule window, the effect of the jitter in the time synchronization and in the injection mechanisms is to be taken into account only once.

Consequently, the performance of the described system may be better than that of PN IRT in networks with higher connection speeds.

The effort needed for configurations is minimized and makes it possible to dynamically add end stations and communication relationships.

The described system may be used to build strong transport networks that achieve high performance with existing TSN mechanisms by using a simple network configuration, and to avoid overload situations and to provide a deterministic behavior of the network.

BRIEF DESCRIPTION OF THE DRAWINGS

FIG. 4 shows an exemplary transmission of streams with additional transmission gaps between data packets;

FIG. 5 shows an exemplary switching delay during data transmission 802.1;

FIG. 6 shows an exemplary switching delay during data transmission with a storing delay;

FIG. 7 shows an exemplary situation with sequential switching;

FIG. 8 shows a situation with parallel switching; and

DETAILED DESCRIPTION

Figure 1:
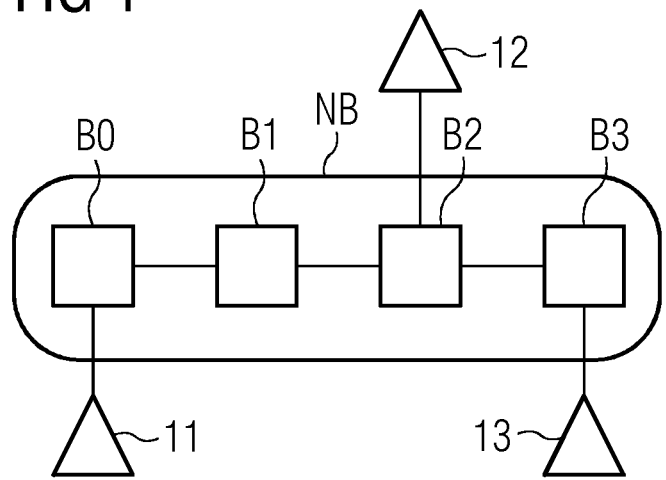
FIG. 1 shows an example of a bus system.
Figure 2:
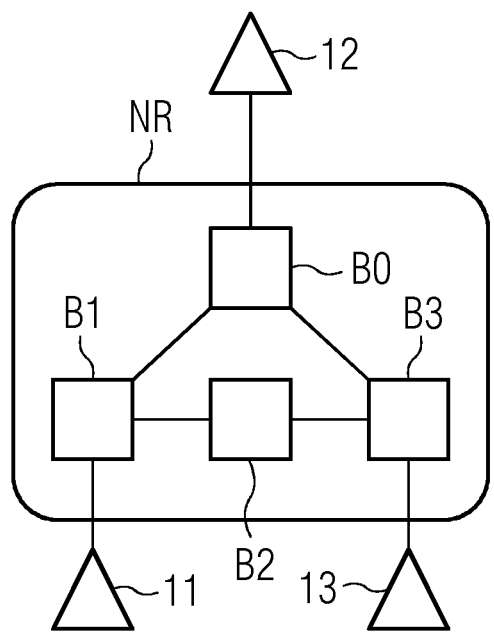
FIG. 2 shows an example of a ring topology.
Figure 3:
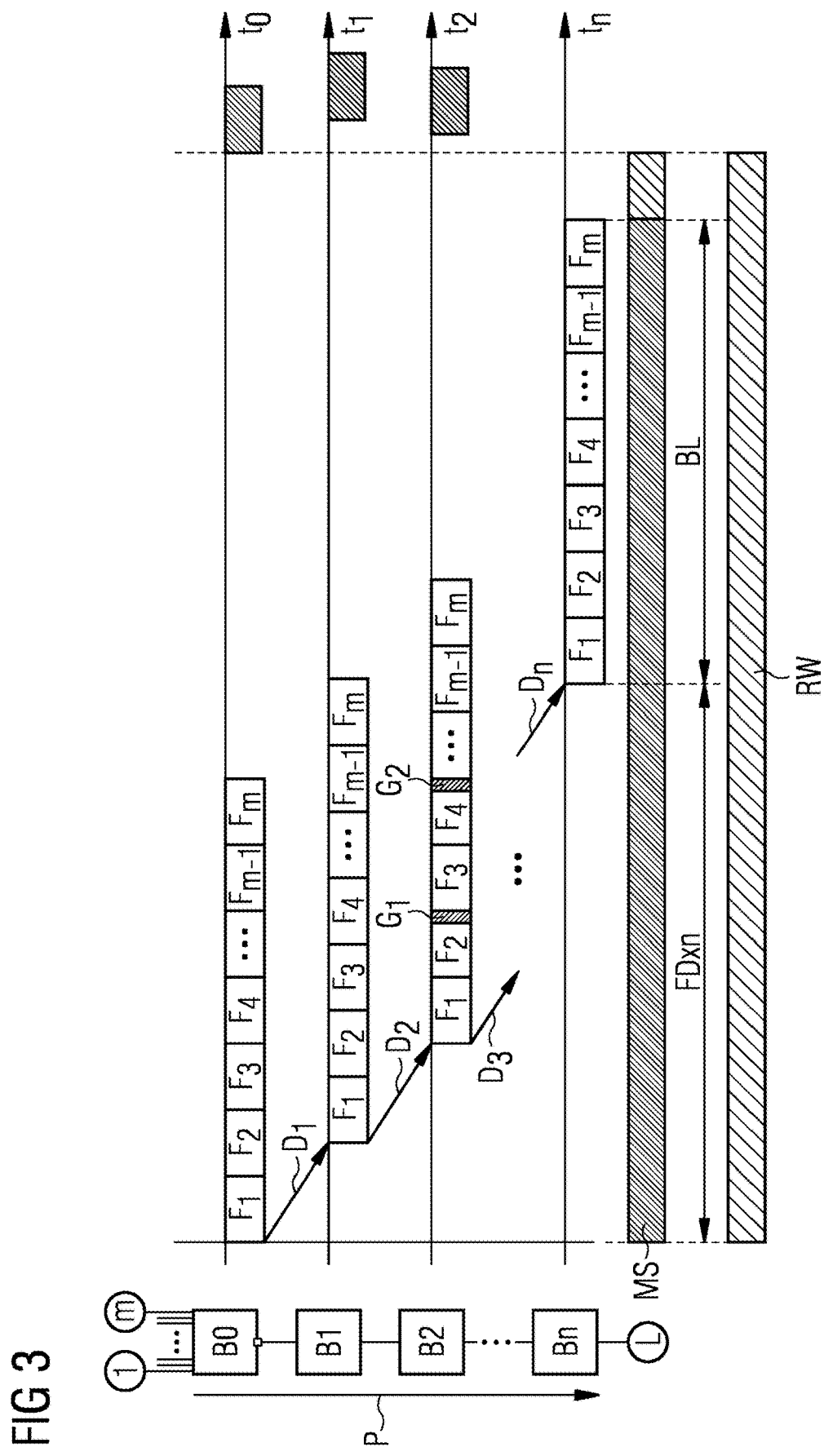
FIG. 3 shows an exemplary transmission of streams in a protected window.

FIGS. 3 and 4 show exemplary transmission of data frames F1, F2, . . . Fm in stations from transmitters 1 . . . m to receiver L (e.g., a listener). The transmission is carried out using a plurality of hops B0, B1, . . . Bn in the network and is respectively carried out with a slight time delay (e.g., forwarding delay D1, D2, . . . Dn). Further time gaps G1, G2 may also arise between two data frames during transmission and are also included in the calculation of the total transmission time MS of the data stream. In this case, the total transmission time MS is shorter than the transmission time window RW reserved for the transmission of the data stream. It is possible to discern a time delay between the first injection of the data packets at the first switching center B0 and the first injection of the data packets at the last bridge Bn, also referred to as a forwarding delay FDxn.

The total transmission time MS is composed of this forwarding delay FDxn and the burst length BL.

FIG. 3 shows an embodiment with the forwarding of packets in the store & forward method (e.g., the individual frame is first of all completely transmitted and is forwarded to the next station only after the individual frame has been completely received). As an alternative, FIG. 4 shows a cut-through method, where the forwarding of the data packets is already initiated before the data packets have been completely transmitted; the forwarding delay D1, . . . Dn is considerably shorter here. Interframe gaps G11, . . . Gn2 are provided between the individual frames in order to obtain collision-free transmission. The burst length BL may therefore be longer as a result of the gaps that are present, but the forwarding delay is somewhat shorter than in the first example.

As a result of the system design (e.g., topology with a line and bundled transmission), the maximum possible number of streams may be generally determined (see FIG. 4).

Figure 9:
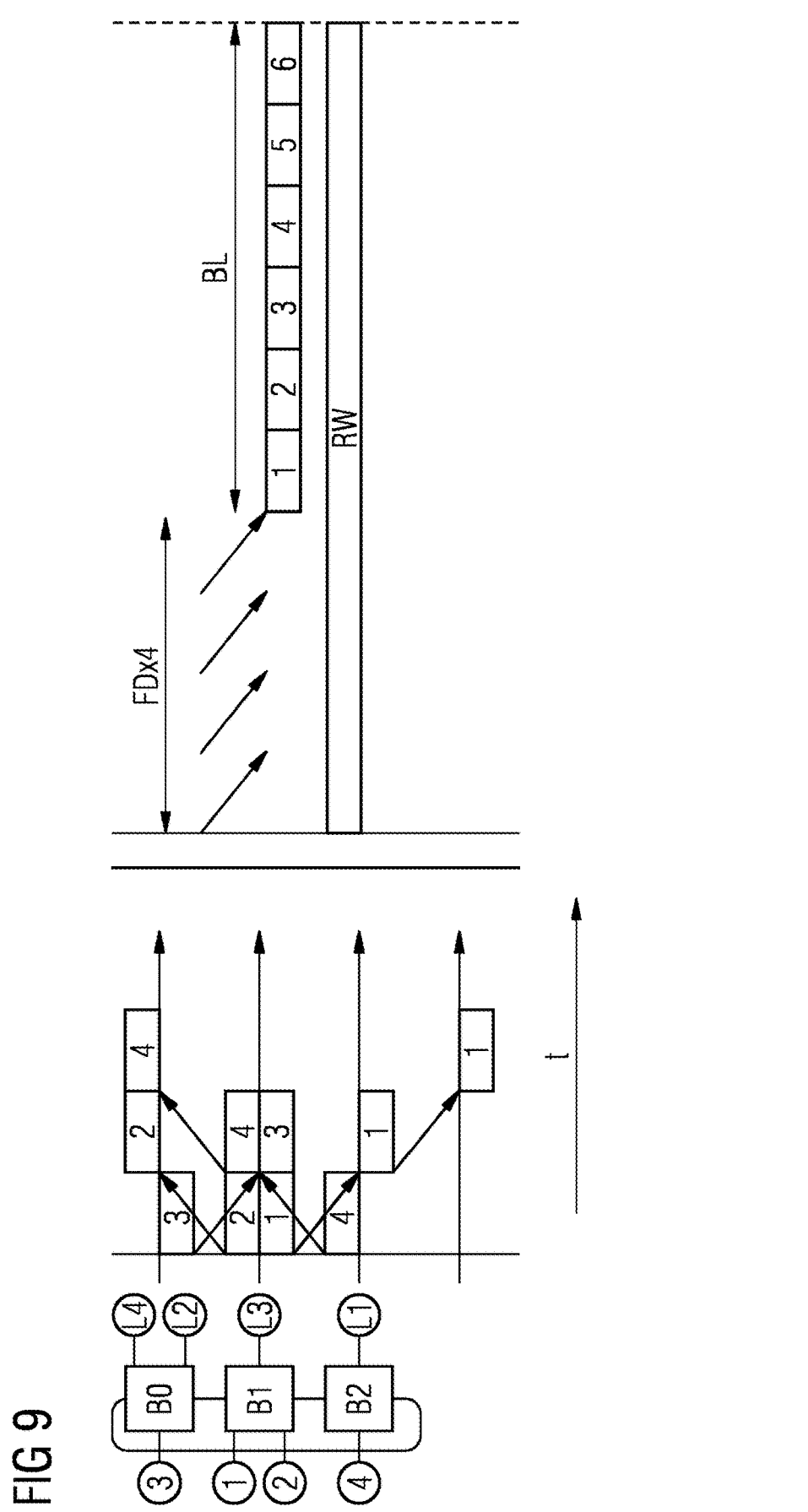
FIG. 9 shows an example with a ring topology and a maximum hop count <=4.

During operation (see FIG. 9)b, if there is a new reservation, a check is carried out in order to determine whether this reservation is still allowed based on the "maximum burst length" from the system design. In the example shown, the number of maximum hops is four.

In this case, the real network may have fewer hops and a different topology. The transmitters and receivers may be connected at any desired locations in the network.

The system design guarantees that the determined maximum number of streams (see "maximum burst length") may always be transmitted in the network, even in the worst-case topology with the worst-case arrangement of the listeners and talkers (e.g., as "bundles of frames"). Yet further streams may also be registered later. In the example illustrated, there are always six streams, but a check is then no longer carried out based on the current network topology and the paths used by the stream.

During operation, the resources that are still available are checked, and this value was already determined during network design by taking into account the worst-case topology.

FIGS. 5 to 8 now show different configurations with regard to what happens inside a switching center Bx at the input port Rx (e.g., burst in) and at the output port Tx (e.g., burst out).

Each data frame F1, F2 includes a data header (e.g., a header or a preamble PRE), and the data part MPDU_1, MPDU_2. A gap IFG (e.g., the interframe gap) is situated between, for example, the data packets.

FIG. 5 shows an example where the first frame F1 is completely received when receiving data, but corresponding forwarding of the data burst at least from the first frame F1' via the output port is initiated already during the reception of a second frame F2 (e.g., storing delay).

The switching delay time is therefore shorter than the sum of (IFG+PRE+MPDU)*bit time. The switching delay is only the time in the transmission gap IFG. The data packets MPDU_1 and MPDU_2 are transmitted in a row.

FIG. 6 shows an example in which the switching delay time is exactly equal to the sum of (IFG+PRE+MPDU)*bit time. In this case, the transmission of each individual data packet is buffered virtually separately.

The transmission gaps in the illustration in FIG. 6 are produced if a bridge is not powerful enough and therefore generates these gaps during transmission (e.g., cannot transmit frames in an uninterrupted manner). This is produced during transmission, is undesirable, but is to be taken into account in the system design.

In the situation illustrated in FIG. 7, the switching delay time is greater than the sum of (IFG+PRE+MPDU)*bit time. There is a transmission gap (e.g., a gap) in the output port. In this case, switching is carried out sequentially (e.g., the first data frame MPDU_1 is processed first, then the second, etc.).

In a similar manner, FIG. 8 then shows a situation with parallel switching that shows dashed regions indicating that the switching for the second data packet has already started before the switching of the first data packet has been concluded.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for a preferred, performant, regular transmission of a set of data packets in an industrial network, the industrial network comprising switching nodes, the method comprising:

transmitting the set of data packets, respectively, on the way from a data transmitter to a data receiver from a first switching node of the switching nodes to a second switching node of the switching nodes;

exclusively reserving a time window of transmission bandwidth for transmitting the set of data packets, respectively, from the first switching node to the second switching node; and time-synchronizing a start of the transmission time window in all transmitting switching nodes in the network, wherein a system design of the industrial network is known and planned before the transmitting of the set of data packets, and wherein exclusively reserving the transmission time window comprises exclusively reserving the transmission time window taking into account a number of switching nodes to be run through, which results from a topology of the industrial network, such that a maximum number of transmissions is always provided within the transmission time window irrespective of the topology of the industrial network.

2. The method of claim 1, wherein transmitting the set of data packets comprises transmitting the set of data packets for a real-time application.

3. The method of claim 1, wherein the set of data packets to be transmitted is provided with a flag.

4. The method of claim 1, wherein the time-synchronizing of the start of the transmission time window is carried out in the industrial network according to the TSN IEEE 802.1 AS-2011 standard.

5. The method of claim 1, wherein the transmission time window (RW) is reserved according to the Profinet IRT IEEE 802.1 Qbv standard.

6. The method of claim 1, wherein transmitting the set of data packets comprises transmitting the set of data packets in one of the switching nodes using a store and forward method.

7. The method of claim 6, wherein a first data packet of the set of data packets to be transmitted is completely received by the one switching node before the first data packet is transmitted on to a subsequent switching node of the switching nodes.

8. The method of claim 1, wherein at least one transmission gap is planned in the set of data packets for transmission between data packets of the set of data packets in order to avoid collisions.

9. The method of claim 1, wherein transmitting the set of data packets comprises transmitting the set of data packets in one of the switching nodes using a cut-through method.

10. The method of claim 9, wherein a first data packet of the set of data packets to be transmitted has not yet been completely received by the one switching node before the first data packet is transmitted on to a subsequent switching node of the switching nodes.

11. A switching node for a preferred, performant transmission of a set of data packets in an industrial network, the industrial network comprising switching nodes, the switching node comprising:

an input port configured to receive the set of data packets on the way from a data transmitter to a data receiver; and an output port configured to transmit the set of data packets to another switching node, wherein a time window of a transmission bandwidth is respectively exclusively reserved for transmission of the set of data packets from a first switching node to a second switching node, wherein a start of the transmission time window is time-synchronized in all transmitting switching nodes in the industrial network, wherein a system design of the industrial network is known and planned before the transmission of the set of data packets, and wherein the exclusive reservation of the transmission time window comprises an exclusive reservation of the transmission time window taking into account a number of switching nodes to be run through, which results from a topology of the industrial network, such that a maximum number of transmissions is always provided within the transmission time window irrespective of the topology of the industrial network.

12. The switching node of claim 11, wherein the time synchronization of the transmission time window is carried out in the industrial network according to the TSN IEEE 802.1 AS-2011 standard.

13. The switching node of claim 11, wherein the transmission time window is reserved according to the Profinet IRT IEEE 802.1 Qbv standard.

14. The switching node of claim 11, wherein a store and forward method is used to transmit the set of data packets in the switching node.

15. The switching node of claim 11, wherein a cut-through method is used to transmit the set of data packets in the switching node.

16. The switching node of claim 11, wherein at least one transmission gap is planned in the set of data packets for transmission between the data packets.

17. The switching node of claim 11, wherein the transmission of the data packets is for a real-time application.

18. The switching node of claim 11, wherein the set of data packets to be transmitted is provided with a flag.

* * * * *